United States Patent
Hicken et al.

(10) Patent No.: US 10,726,534 B1
(45) Date of Patent: Jul. 28, 2020

(54) LAYOUT PROJECTION

(71) Applicant: Lazer Layout, LLC, Logan, UT (US)

(72) Inventors: Kevin R. Hicken, Logan, UT (US);
Rocco J. Ruggiero, Layton, UT (US);
Michael A. Luebke, Orem, UT (US);
Scott C. Petersen, Richland, WA (US)

(73) Assignee: LAZER LAYOUT, LLC, Logan, UT (US)

( * ) Notice: Subject to any disclaimer, the term of this patent is extended or adjusted under 35 U.S.C. 154(b) by 0 days.

(21) Appl. No.: 15/207,387

(22) Filed: Jul. 11, 2016

Related U.S. Application Data

(60) Provisional application No. 62/190,467, filed on Jul. 9, 2015.

(51) Int. Cl.
| | |
|---|---|
| *G06T 7/60* | (2017.01) |
| *G03B 21/28* | (2006.01) |
| *G06T 7/00* | (2017.01) |
| *G01B 21/16* | (2006.01) |
| *G01B 11/00* | (2006.01) |

(52) U.S. Cl.
CPC .......... *G06T 7/0004* (2013.01); *G01B 11/002* (2013.01); *G01B 21/16* (2013.01); *G03B 21/28* (2013.01); *G06T 7/004* (2013.01); *G06T 7/60* (2013.01); *G06T 2207/30108* (2013.01)

(58) Field of Classification Search
None
See application file for complete search history.

(56) References Cited

U.S. PATENT DOCUMENTS

| | | | | |
|---|---|---|---|---|
| 9,891,791 B1* | 2/2018 | Khan | .................... | G06F 3/0484 |
| 2008/0143581 A1* | 6/2008 | Kreiner | .................. | G01S 17/89 |
| | | | | 342/22 |
| 2012/0057174 A1* | 3/2012 | Briggs | ................. | G01C 15/002 |
| | | | | 356/603 |
| 2012/0169530 A1* | 7/2012 | Padmanabhan | ........ | G01C 15/00 |
| | | | | 342/146 |
| 2012/0310602 A1* | 12/2012 | Jacobi | ................. | G06F 17/5004 |
| | | | | 703/1 |
| 2013/0138466 A1* | 5/2013 | Kahle | ............ | G06Q 10/063114 |
| | | | | 705/7.15 |
| 2014/0078519 A1* | 3/2014 | Steffey | .................. | G01S 7/4817 |
| | | | | 356/625 |

(Continued)

*Primary Examiner* — Dave Czekaj
*Assistant Examiner* — Samuel D Fereja
(74) *Attorney, Agent, or Firm* — Patent Law Works LLP

(57) ABSTRACT

Technology projecting a layout is provided. The technology may include an apparatus having a location sensor that determines location data of a projection apparatus associated with a physical premises; a layout engine, that receives a blueprint of the physical premises determines a location of the projection apparatus relative to objects depicted by the blueprint, identifies projection area coordinates of a projection area of a portion of the blueprint related to the location of the projection apparatus, and identifies object coordinates of objects from the blueprint within the projection area; a projection engine, that receives the object coordinates of the objects, calculates mirror positions of the projection apparatus based on the object coordinates of the objects; and a projector projecting a representation of the object coordinates on a physical surface using the mirror positions.

20 Claims, 6 Drawing Sheets

(56) References Cited

U.S. PATENT DOCUMENTS

| | | | |
|---|---|---|---|
| 2015/0369593 A1* | 12/2015 | Myllykoski | G06T 7/73 348/136 |
| 2016/0033652 A1* | 2/2016 | Gil | G01S 19/46 342/357.29 |
| 2016/0119602 A1* | 4/2016 | Yushiya | H04N 9/3185 348/745 |
| 2016/0295185 A1* | 10/2016 | Mima | G09G 5/36 |

\* cited by examiner

LAYOUT PROJECTION

CROSS REFERENCE TO RELATED APPLICATIONS

The present application claims priority, under 35 U.S.C. § 119, to U.S. Provisional Patent Application No. 62/190,467, filed Jul. 9, 2015 entitled "Lazer Layout Handheld Device," which is incorporated by reference in its entirety.

BACKGROUND

Field of the Invention

The specification generally relates to technology for projecting a layout on a physical surface.

Description of the Background Art

Working on construction sites requires measuring out a representation of a blueprint to place every feature at desired locations indicated by the blueprint. Some current methods of laying out construction sites incorporate pulling a fiberglass measuring tape from site foundation structural components of a building that is being built. However, using a fiberglass measuring tape to measure distances and mark out locations for building's structural components is very time consuming, utilize markers that are not persistent (e.g., may be subject to change over time by weather and working conditions), require re-measuring, and require consistency and continual precision. These factors typically lead to measurement error, which results in structural components (e.g., walls, pipes, electrical wires, etc.) being installed in the incorrect locations (different positions than the positions indicated by the blueprint).

Therefore, a need exists for blueprint technology that eliminates human error and is more efficient than existing solutions, such as pulling fiberglass measuring tape from a site foundation to a desired location.

SUMMARY

The techniques introduced herein overcome the deficiencies and limitations of the prior art, at least in part, by providing innovative technology for projecting a layout.

One innovative aspect, an apparatus for projecting layout includes a location sensor that determines location data associated with a location of a projection apparatus, the location of the projection apparatus being associated with a physical premises; a layout engine, executable by one or more processors, that receives a blueprint of the physical premises via an electronic information source, determines a location of the projection apparatus relative to objects depicted by the blueprint that form a pictorial representation of the physical premises, identifies projection area coordinates of a projection area of at least a portion of the blueprint related to the location of the projection apparatus, and identifies object coordinates of one or more objects from the blueprint within the projection area; a projection engine, executable by the one or more processors, that receives the object coordinates of the one or more objects, calculates first mirror positions of a first mirror of the projection apparatus and second mirror positions of a second mirror of the projection apparatus based on the object coordinates of the one or more objects; and a projector, including the first mirror and the second mirror, the projector projecting a representation of the object coordinates on a physical surface using the first mirror positions and the second mirror positions.

In another innovative aspect, a method for projecting a layout includes receiving, from a location sensor, location data associated with a location of a layout projector, the location of the layout projector being associated with a physical premises; receiving, using one or more processors, a blueprint of the premises from an electronic information source; identifying, using the one or more processors and the location data, location coordinates of the layout projector relative to objects depicted by the blueprint that form a pictorial representation of the physical premises; identifying, using the one or more processor and the location coordinates of the layout projector, projection area coordinates of a projection area of at least a portion of the blueprint related to the location of the projection apparatus; identifying, using the one or more processors, object coordinates of one or more objects from the blueprint within the projection area; calculating, using the one or more processors, mirror positions of one or more mirrors of a projector using the object coordinates; and projecting, via the projector using the mirror positions of the one or more mirrors, a representation of the one or more objects.

Other aspects include corresponding methods, systems, apparatuses, and computer program products for these and other innovative aspects.

The features and advantages of the technology described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
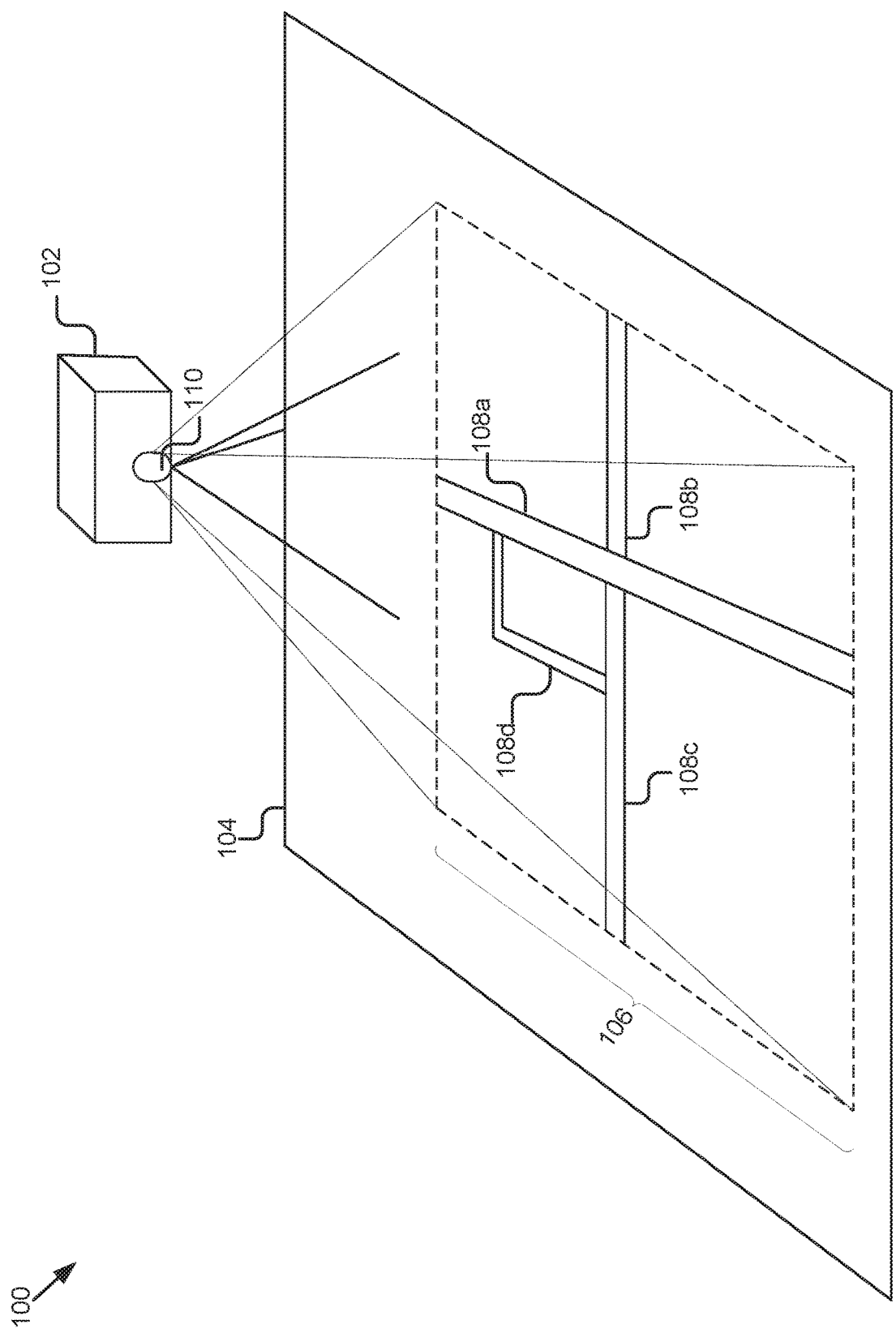
FIG. 1 shows a graphical representation illustrating an example system including a layout device projecting a layout.

FIG. 1 shows a graphical representation of an example system 100 including a layout device 102 projecting a layout 108. The layout device 102 may include sensors that provide a location of the layout sensor 102 and/or an orientation of the layout device 102. The layout device 102 may also include a projector 110 capable of projecting a representation of the layout 108. In some embodiments, the projector 110 may be made up of one or more mirrors and one or more emitters, as discussed in further detail below.

As depicted, the layout device 102 is arranged to project the representation of a layout 108 on a physical surface 104. The physical surface 104 may be any suitable surface of a premise. For example, the physical surface 104 may be a floor, wall, ceiling, etc., of a work site. In some embodiments, the representation of the layout 108 may be projected within a projection area 106. The projection area 106 may be based on an area of a blueprint, and the layout device 102 may project the representation of the layout 108 within the projection area 106 on the physical surface 104.

In some embodiments, the representation of the layout 108 may include one or more objects from a blueprint or other design document (referred to simply as blueprint). In some embodiments, the blueprint is an electronic document that describes the building specifications for the premises, and includes pictorial and textual information of the elements comprising the premises, such as wall locations, pipe locations, electrical conduit locations, footing locations, appliance locations, walkways, landscaping elements, etc., for the indoor and/or outdoor area(s) of the premises, such as the various floors, yards, lots, etc., of the premises. The projected objects may include any of these elements included in the blueprint.

In a non-limiting example, the layout device 102 may be used on a construction site of a building. A worker may upload a blueprint to the layout device 102 and the layout device 102 may be positioned above a portion of the work site that will be measured based on the layout included within the blueprint. In some embodiments, a worker may use an application executed on a computer, such as a mobile device, to configure the projection. For instance, inputs are provided via the application specifying the blueprint, configure the projection area 106 of the layout device 102, etc.

Continuing this example, the layout device 102 may receive positional sensor data, such as location data and/or orientation data associated with the layout device 102, and automatically determine positional attributes of the layout device 102, such as the physical location of the layout device 102. Using the determined location, the layout device 102 may identify a portion of the blueprint that corresponds to the physical location of the layout device 102 and identify objects represented in the blueprint in relation to the physical location of the layout device 102.

Using the positional information, the layout device 102 may also calculate positions for the mirrors of the projector of the layout device 102 in order to project a representation of the layout 108 on the physical surface 104. When determining the positions of the mirrors, the layout device 102 may, in some cases, also make any orientational adjustments, such adjustments to address skewing, keystoning, etc., of the projection. This allows for the workers on site to quickly setup the layout device 102 without having to manually position and level the layout device 102 before projecting the representation of the layout 108, which advantageously increases accuracy and speed while reducing error. Further, the projected layout 108 on the physical surface 104 can provide significantly more detail and resolution for the components to be built than existing solutions (e.g., pencil markings, chalk markings, spray paint, etc.), and allows the workers to visualize the layout, accurately place, and build structural components depicted in the representation of the layout 108, etc.

In a further example, a worker can conveniently and quickly move the layout device 102 to different locations on the premises, and the layout device 102 may automatically determine the different locations and automatically provide the layouts related to the different locations. In some embodiments, the layout device 102 may include and/or be connected to a moveable device, such as a robot or drone, and the layout device 102 may be configured to automatically, or based on instruction, move to various locations within the premises. For instance, the layout device 102 may be configured to follow a worker or follow a predetermined route to project a layout 108 as the layout device 102 moves.

In some embodiments, the layout device 102 may provide representations of the layout 108 using certain visually distinguishable indicators, such as different colors, shapes, line-widths and/or types, etc., to differentiate different components from one another, such as walls from footings, etc. In further embodiments, the layout device 102 may be programmed to include visual representations (lines, arrows, measurements, etc.) of dimensions for the components in the layout 108 representation that it projects. For instances, dimensions of walls, walkways, appliances, and other objects may be determined from the blueprint and projected for visualization by the workers.

In FIG. 1 and the remaining figures, a letter after a reference number, e.g., "108a," represents a reference to the element having that particular reference number. A reference number in the text without a following letter, e.g., "108," represents a general reference to instances of the element bearing that reference number.

The system 100 may include one or more electronic information sources (not shown) that can be accessed by the layout device 102. The information source(s) may be local and/or remote, and include one or more non-transitory computer-readable media, for storing, retrieving, updating, deleting, and/or otherwise manipulating data, such as blueprint documents, positional data, user settings, premises-related settings, etc. The layout device 102 may be communicatively coupled to the electronic information source via a communications bus, a computer network (e.g., wired and/or wireless network connection and corresponding interfaces, etc., (not shown).

In some embodiments, an electronic information source may be a computing device that includes a memory and a processor, for example a server, a laptop computer, a desktop computer, a tablet computer, a mobile telephone, a smartphone, a personal digital assistant (PDA), a mobile email device, a webcam, a user wearable computing device, or any other electronic device capable of accessing a network. The electronic information source may, in some cases, provide general graphics and multimedia processing for any type of application. In some embodiments, the electronic information source may include a display for viewing and/or inputting information on an application, such as blueprint documents, positional data, user settings, premises-related settings, etc.

A computer network can be a conventional type, wired or wireless, and may have numerous different configurations including a star configuration, token ring configuration or other configurations. Furthermore, the network may include a local area network (LAN), a wide area network (WAN) (e.g., the Internet), and/or other interconnected data paths across which multiple devices may communicate. In some embodiments, the network may be a peer-to-peer network. The network may also be coupled to or include portions of a telecommunications network for sending data in a variety of different communication protocols. In some embodiments, the network may include Bluetooth communication networks or a cellular communications network for sending and receiving data including via short messaging service (SMS), multimedia messaging service (MMS), hypertext transfer protocol (HTTP), direct data connection, push notifications, WAP, email, etc.

Figure 2:
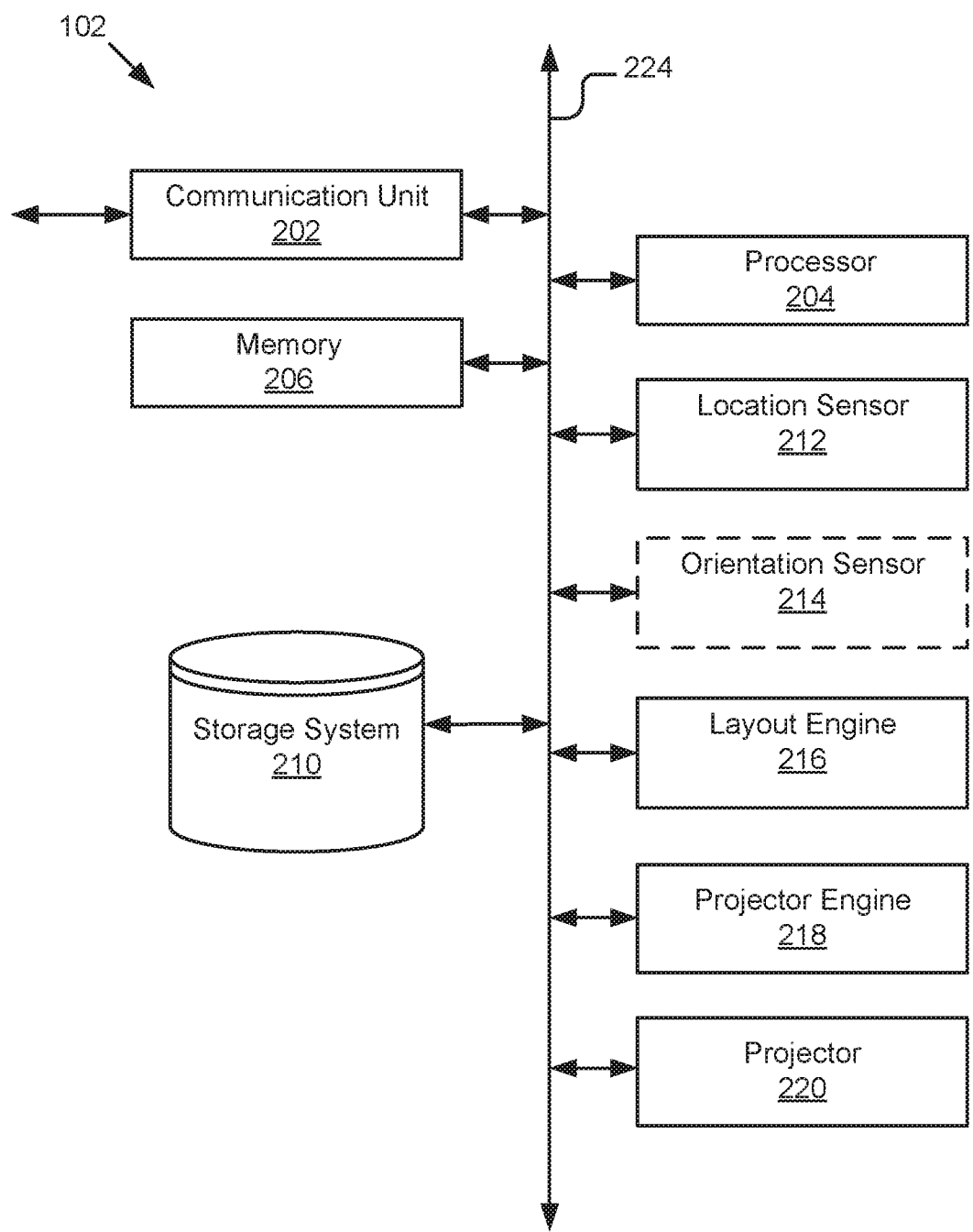
FIG. 2 shows a block diagram illustrating an example layout device.

FIG. 2 illustrates a block diagram illustrating an example layout device 102. The example layout device 102 may include a communication unit 202, a processor 204, a memory 206, a storage system 210, a location sensor 212, an orientation sensor 214, a layout engine 216, a projector engine 218, and/or a projector 220 according to some examples. The components of the layout device 102 may be configured to project a representation of the layout 108, as discussed elsewhere herein. The components of the layout device 102 are communicatively coupled by a bus and/or software communication mechanism 224, which may represent an industry standard architecture (ISA), a peripheral component interconnect (PCI) bus, a universal serial bus (USB), or some other suitable architecture.

The processor 204 may execute software instructions by performing various input/output, logical, and/or mathematical operations. The processor 204 may have various computing architectures to process data signals including, for example, a complex instruction set computer (CISC) architecture, a reduced instruction set computer (RISC) architecture, and/or an architecture implementing a combination of instruction sets. The processor 204 may be physical and/or virtual, and may include a single processing unit or a plurality of processing units and/or cores.

In some embodiments, the processor 204 may be coupled to the memory 206 via the bus and/or software communication mechanism 224 to access data and instructions therefrom and store data therein. The bus and/or software communication mechanism 224 may couple the processor 204 to the other components of the computing device 200 including, for example, the memory 206, the communication unit 202, the layout engine 216, the projector engine 218, the projector 220, and the storage system 210. It should be understood that other processors, operating systems, sensors, displays and physical configurations are also possible.

The memory 206 may store and provide access to data for the other components of the layout device 102. The memory 206 may be included in a single computing device or may be distributed among a plurality of computing devices as discussed elsewhere herein. In some embodiments, the memory 206 may store instructions and/or data that may be executed by the processor 204. The instructions and/or data may include code for performing the techniques described herein. For example, in one embodiment, the memory 206 may store layout engine 216 and/or the projector engine 218. The memory 206 is also capable of storing other instructions and data, including, for example, an operating system, hardware drivers, other software applications, databases, etc. The memory 206 may be coupled to the bus or software communication mechanism 224 for communication with the processor 204 and the other components of the layout device 102.

The memory 206 may include one or more non-transitory computer-usable (e.g., readable, writeable) devices, a static random access memory (SRAM) device, an embedded memory device, a discrete memory device (e.g., a PROM, FPROM, ROM), a hard disk drive, an optical disk drive (CD, DVD, Blu-ray™, etc.), which can be any tangible apparatus or device that can contain, store, communicate, or transport instructions, data, computer programs, software, code, routines, etc., for processing by or in connection with the processor 204. In some embodiments, the memory 206 may include one or more of volatile memory and non-volatile memory. It should be understood that the memory 206 may be a single device or may include multiple types of devices and configurations.

The communication unit 202 is hardware for receiving and transmitting data by linking the processor 204 to the network and other processing systems. The communication unit 202 may receive data, such as blueprint documents or other electronic information, from other electronic information source(s), and may provide the data to the other components of the layout device 102, for processing and/or storage. In some embodiments, the communication unit 202 may transmits data (e.g., positional data, settings, premises-related information, etc.) to other electronic information source(s) for processing and/or display. The communication unit 202 may include one or more wired and/or wireless interfaces. The communication unit 202 may provide standard connections to the network for distribution of files and/or media objects using standard network protocols, such as TCP/IP, HTTP, HTTPS and SMTP.

In some embodiments, the communication unit 202 may include a port for direct physical connection to the client device 132 or to another communication channel. For example, the communication unit 202 may include an RJ45 port or similar port for wired communication with an electronic information source. In some embodiments, the communication unit 202 may include a wireless transceiver (not shown) for exchanging data with the electronic information source or any other communication channel using one or more wireless communication methods, such as IEEE 802.11, IEEE 802.16, Bluetooth® or another suitable wireless communication method. In some embodiments, the communication unit 202 may include a cellular communications transceiver for sending and receiving data over a cellular communications network such as via short messaging service (SMS), multimedia messaging service (MMS), hypertext transfer protocol (HTTP), direct data connection, push notification, WAP, e-mail or another suitable type of electronic communication. Other suitable variations for communicating data are also possible and contemplated.

The storage system 210 is an electronic information source that includes a non-transitory memory that stores data, such as the data discussed elsewhere herein. The storage system 210 may be local and/or remote. The storage system 210 may be a dynamic random access memory (DRAM) device, a static random access memory (SRAM) device, flash memory or some other memory device. In some embodiments, the storage system 210 also may include a non-volatile memory or similar permanent storage device and media including a hard disk drive, a solid state drive, a floppy disk drive, or some other mass storage device for storing information on a more permanent basis. In the illustrated embodiment, the storage system 210 is communicatively coupled to the bus or software communication mechanism 224.

The location sensor 212 may include one or more sensors that capture attribute(s) of an external environment of the layout device 102 and determine a physical location of the layout device 102 based on the attribute(s). The location sensor 212 may include hardware and/or software capable of determining the physical location. The location sensor 212 may be configured to provide the location data and/or physical location to the layout engine 216 and/or the projector engine 218, and/or may store the data for access and/or retrieval thereby.

In some embodiments, the location sensor 212 may include one or more sensors such as a Global Positioning System (GPS) sensor, Global Navigational Satellite System (GLONASS) sensor, Galileo system sensor, a BeiDou sensor, an IRNSS sensor, a QZSS sensor, a LIDAR sensor, an ultra-wideband sensor, a radio-positioning sensor, and/or a Real Time Location System (RTLS) sensor. An RTLS sensor may be a used to automatically identify and track the locations of objects/people in real time. An RTLS may use active RFID, active RFID-IR, optical locating, infrared, low-frequency signpost identification, semi-active RFID, passive RFID RTLS locating via steerable phased array antennae, radio beacons, ultrasound identification, ultrasonic ranging, wide-over-narrow band, wireless local area network, Bluetooth, clustering in noisy ambience, and/or bivalent systems to track the locations.

In some embodiments, the location sensor 212 may be embodied by the communication unit 202, and positional data may be determined by triangulating position between radio communication nodes (e.g., other wireless transceivers, triangulation data determined by a third-party (e.g., wireless carrier), etc. Any other suitable variations for determining location are also possible and contemplated. In some embodiments, the location sensor 212 may be configured to collect location data based upon a request to collect location data. In further embodiments, the location sensor 212 may collect location data continuously or at regular intervals. In some embodiments, the location sensor 212 may determine a physical location of the layout device 102 to within a precise threshold, such as 3/16 of an inch, in order to provide precise accuracy of the layout device 102 and the projection.

The orientation sensor 214 may include one or more sensors that collect orientation data and determine an orientation (e.g., pitch, azimuth, yaw, roll, etc.) of the layout device 102. The orientation sensor 214 may be hardware and/or software capable of determining the orientation of the layout device 102. The orientation sensors 214 may be configured to provide the orientation data to the layout engine 216 and/or the projector engine 218. In some embodiments, the orientation sensor 214 may include one or more accelerometers, gyroscopes, or other devices capable of detecting orientation. In some embodiments, the orientation sensor 214 may be configured to determine yaw, azimuth, pitch, and/or roll. In some embodiments, the orientation sensor 214 may be configured to collect orientation data based upon a request to collect orientation data. In further embodiments, the orientation sensor 214 may collect orientation data continuously or at regular intervals. In some embodiments, the orientation sensor 214 may determine the orientation of the layout device 102 to be situated within a precise threshold, such as within 0.1, 0.5, 1, 1.5, and/or 2+ degrees of accuracy, in order to provide precise accuracy of the layout device 102 and the projection.

The layout engine 216 may include computer logic to provide the functionality for determining a representation of the layout 108 from a blueprint. The computer logic may be implemented in software, hardware, and/or a combination of the foregoing. The layout engine 216 may be configured to determine a location of the layout device 102 in relation to the blueprint, and may be configured to determine a coordinate system relative to the location of the layout device 102. The layout engine 216 may use the coordinate system to map coordinates of objects identified within the blueprint, which form a pictorial representation of at least a portion of the physical premises. The layout engine 216 may be configured to determine a projection area 106. The layout engine 216 may be configured using an application executed by an electronic information source. For instance, the application may instruct the layout engine 216 to alter the projection area 106 and/or the representation of the layout 108 based on inputs received via one or more input devices (e.g., touchscreen, keyboard, pointing device, microphone, etc.) from a user of the application. The layout engine 216 is discussed in further detail elsewhere herein.

The projector engine 218 may include computer logic that calculates mirror positions based on the coordinates of objects from the blueprint. The computer logic may be implemented in software, hardware, and/or a combination of the foregoing. The projector engine 218 may use certain algorithms to calculate the mirror positions, as described elsewhere herein. The projector engine 218 may, in some cases, be configured to automatically incorporate the orientation data into the calculations of the mirror positions in order to reduce the effect of a misorientation (e.g., tilt beyond a predetermined threshold) of the layout device 102.

The projector 220 may include computer logic to provide the functionality for projecting the representation of the layout 108. The computer logic may be implemented in hardware, software and hardware, etc. The projector 220 may be capable of projecting light embodying a layout. In some embodiments, the projector may be controlled by a user and may be turned on and off based on inputs from the user.

In some embodiments, the projector 220 may include a galvanometer having an emitter, (e.g. a laser, a light source, etc.), and two or more mirrors configured to change the direction of the output of the emitter based on the angles of reflection when the output contacts the surfaces of the mirrors.

In some embodiments, the projector 220 may be configured to output and adjust the mirrors at a high frequency (such as, but not limited to, a spin rate of $7.44 \times 10^3$ rpm) to project a series of points that create an image when projected rapidly, such as a line, a wall, etc. In further embodiments, the projector 220 may include multiple emitters, to increase the frequency of projection and/or project representations in different colors or other indications, etc. In some embodiments, the projector 220 may be configured to project a representation of the layout 108 on a two-dimensional surface below or in front of the layout device 102. In some embodiments, the projector 220 may be able to rotate and project a representation of the layout 108 on multiple surfaces at a high frequency. For example, a rotating projector 220 capable of projecting the representation of the layout 108 in every direction along a plane.

In some embodiments, the projector 220 may be configured to project a solid line representation using the coordinates of objects in the blueprint. The projector 220 may be optimized to produce more points where the lines change directions or intersect. In further embodiments, the projector 220 may be configured to minimize overshoot at direction changes to preserve the accuracy of the representation. In some embodiments, the projector 220 may be configured to provide accuracy at 3/16" to provide suitable representations for a work site.

Figure 3:
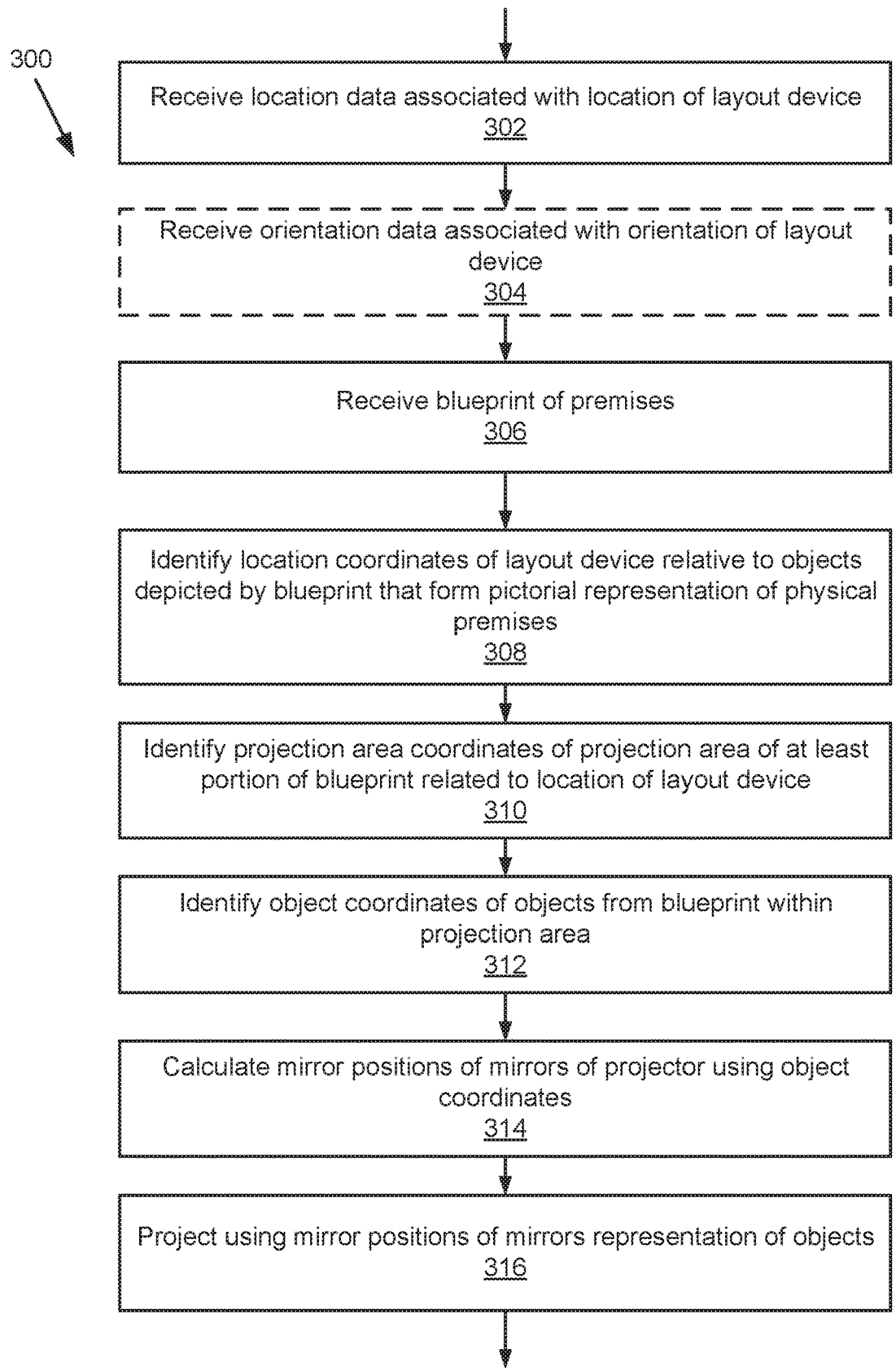
FIG. 3 shows a flow diagram illustrating an example method for projecting a layout.

FIG. 3 shows a flow diagram illustrating a method 300 for projecting a layout. At 302, the layout engine 216 receives location data associated with the location of the layout device 102. The layout engine 216 may receive the location data from the location sensor 212. The location sensor 212 captures location data related to the physical location of the layout device 102. For example, the location sensor 212 may use ultra-wideband to determine a distance and/or location from known points to identify the physical location of the layout device 102 as being in a specific location of a physical premise.

At 304, the projection engine 218 receives orientation data associated with the orientation of the layout device 102. The orientation sensor 214 captures orientation data describing the orientation of the layout device 102 relative to a known plane (e.g., whether the layout device 102 is tilted relative to that plane). For example, the orientation sensor 214 may use one or more accelerometers, gyroscopes, etc., to determine that the layout device 102 is not level, and a projection would be distorted if not corrected either by leveling the layout device 102 and/or incorporating the tilt into mirror angle calculations. In some embodiments, the orientation data may be omitted where a higher degree of accuracy is not required to correct tilt errors.

At 306, the layout engine 216 receives a blueprint of the physical premises from an electronic information source. The electronic information source may send the blueprint to the layout engine 216 in response to a user interacting with an application coupled to the electronic information source. The layout engine 216 may store the received blueprint in the storage system 210, the memory 206, or another non-transitory medium, for later processing by the components of the layout device 102. For example, the layout engine 216 may receive a blueprint of a construction project of the physical premises the layout device 102 is located on.

At 308, the layout engine 216 may identify location coordinates of the layout device 102 relative to objects depicted by the blueprint that form pictorial representations of the physical premises. The layout engine 216 may process the blueprint to create a coordinate plane and identify a set of location coordinates on this created coordinate plane that is associated with the specific location of the layout device 102. For example, the layout device 102 may be determined to be at a point corresponding to an intersection of two walls (for example, as depicted by 108a, 108b, and 108c of FIG. 1) and may determine a set of coordinates to map the layout device 102 to.

At 310, the layout engine 216 may identify projection area coordinates, associated with a projection area 106 of the projector 220 on the physical surface 104, of at least a portion of the blueprint related to the location of the layout device 102. The projection area coordinates are coordinates on the coordinate plane created above with respect to 308 that indicate a boundary of the area the projector 220 can project the representation of the layout 108. In some embodiments, the projection area coordinates are determined based on the limitations of the projector 220 that are programmed in by a technician. In further embodiments, the projection area coordinates may be adjusted by a user on an application executed on the electronic information source. For example, a worker may input into the application that the projection area is a 10-foot-by-10-foot area and the layout engine 216 may identify projection area coordinates that create a 10-foot-by-10-foot area on the blueprint in relation to the location coordinates of the layout device 102.

At 312, the layout engine 216 may identify one or more object coordinates of one or more objects from the blueprint that are included within the projection area coordinates. The object coordinates are coordinates on the coordinate plane created above that indicate the lines and other representations of objects included within the area of the projection area coordinates. The object coordinates may be determined relative to the position coordinates associated with the layout device 102. The layout engine 216 may identify objects included within the blueprint using standard image processing techniques in order to identify areas where objects are represented.

The objects may be depicted as lines, shapes, text, etc., in the blueprint, and the layout engine 216 may determine points and/or functions on the coordinate plane that together create a representation of the object on the coordinate plane. For example, the projection area coordinates may include an object of a wall denoted by two straight lines equal distance apart (for example, the lines of the representation of the layout 108a.) The layout engine 216 may determine a series of points described by object coordinates on the coordinate plane that together describe the lines that make up the wall.

In some embodiments, the layout engine 216 may identify object coordinates of objects within a specified minimal distance from previous points in order to create suitable accuracy, for example 3/16" for a work site representation. In further embodiments, the layout engine 216 may receive information from an application related to the distance between object points that may be specified by a user.

At 314, the projector engine 218 may calculate mirror positions for mirrors of the projector 220 using the object coordinates. In some embodiments, the projector 220 includes at least two mirrors for adjusting the location of the projection, the projector engine 218 may calculate a mirror angle for the first mirror, and a mirror angle for the second mirror as described elsewhere herein. The projector engine 218 uses the object coordinates to identify the location of the projection of a point on the physical surface in relation to the location of the layout device 102. In further embodiments, the projector engine 218 may include the orientation data in the calculation of the mirror positions in order to reduce errors introduced by a tilt of the layout device 102 (e.g., keystoning, skewing, etc.), as described elsewhere herein.

At 316, the projector 220 projects a representation of the objects using the mirror positions of the mirrors. In some embodiments, the projector 220 uses the mirror coordinates of the two mirrors of the projector 220 to adjust the point where the emitter (e.g., a laser) impacts the physical surface 104 based on the calculated mirror positions. The projector 220 creates representations of the objects by projecting a series of points output from an emitter (e.g., a laser), at a frequency necessary to visualize an object, as the mirrors adjust based on the mirror coordinates. For example, as seen in FIG. 1, the representation of the layout 108 depicts walls 108a, 108b, 108c, and pipe conduit 108d on the physical surface 104.

Figure 4:
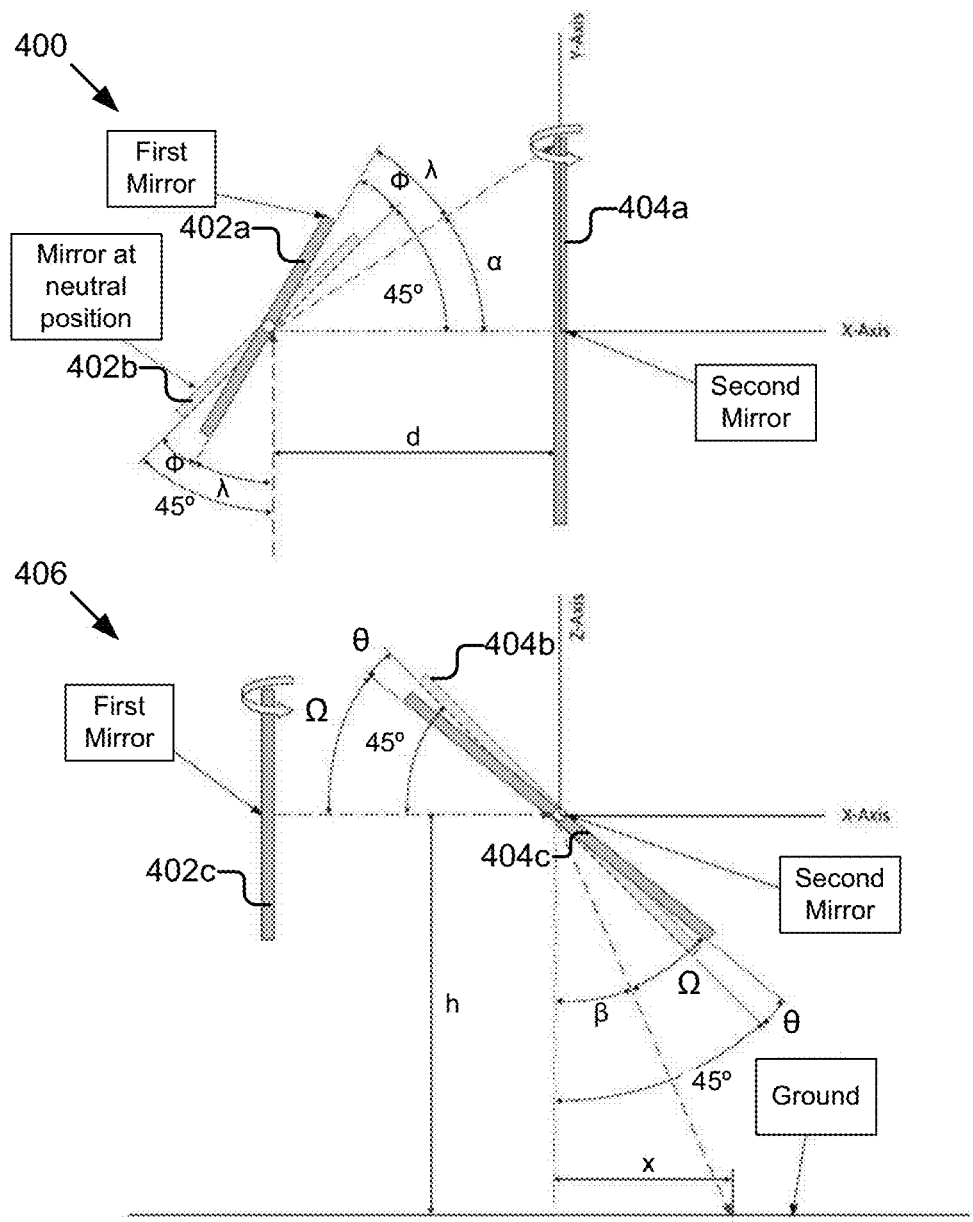
FIG. 4 shows a graphical representation of example mirrors in a layout device.

FIG. 4 shows graphical representations of example mirrors in a layout device 102 from a first view 400 and a second view 406. The first view 400 shows a graphical representation the first mirror 402 at an example angled position 402a and a neutral position 402b and the second mirror 404a. The first view 400 is depicted from the perspective of the z-axis. The second view 406 shows a graphical representation of the first mirror 402c and the second mirror at a neutral position 404b and an example angled position 404c. The second view is depicted from the perspective of the y-axis. The first mirror angle and the second mirror angle are calculated as described by the equations derived below.

By the law of reflection, the angle of incidence of a light ray on a surface is equal to the angle of reflectance, where both angles are measured from the surface normal. By the supplementary angle rule it can be found that both angles labeled as λ and both angles labeled as Ω are equal and it can be seen that:

$$45°+\phi=\lambda+\alpha$$

On the opposite side of the mirror 402 it can be seen that:

$$\lambda=45°-\phi$$

Solving both equations for a (the angle between the reflected beam and the x-axis) yields:

$$\alpha = 45° - 45° + \phi + \phi$$

$$\alpha = 2\phi$$

The y-position of where the laser of the projector 220 will shine can be found using trigonometry and angle α. Because the axis of rotation of the second mirror 404 is about the y-axis, the second mirror 404 will not change the angle of the laser beam with respect to the xz plane, but rather, the second mirror 404 will only reflect the laser beam towards the xy plane. As a result, the path of the laser beam for the y-axis can be represented simply as starting at the first mirror 402 and crossing a distance "d" (the distance between the two mirrors) and height "h" (the height of the mirrors above the ground). The distance "d" can be provided by a technician and programmed into the projector 220. The height "h" may be included in the location data and provided to the projector engine 218 by the location sensor 212. The tangent function can be obtained as:

$$\tan(\alpha) = \frac{opp}{adj} = \frac{y}{d+h}$$

$$y = (d+h)\tan(\alpha)$$

From that solution y can be obtained as:

$$y = (d+h)\tan(2\phi)$$

The x-position of where the laser of the projector 220 will shine can be found using the same process:

Angle solution:

$$\beta + \Omega = \theta + 45°$$

$$\Omega = 45° - \theta$$

$$\beta = \theta + 45° - 45° + \theta$$

$$\beta = 2\theta$$

X-position solution:

$$\tan \beta = opp/adj = -x/h$$

$$x = -h \tan(\beta)$$

$$x = -h \tan(2\theta)$$

The x-position solution does not account for rotation and tilting of the layout device 102. Tilting of the layout device 102 would simply alter the angle the beam left the projector 220 relative to the floor plane of the physical surface 104. Adding the angle of tilt directly to the mirror positions (described as angles) can compensate for the tilting of the layout device 102. In some embodiments, disregarding the "d", because it will be small compared to the "h", the following results:

$$x = -h \tan(2\theta + \beta)$$

If "d" is not disregarded then the following equation for x results:

$$x = -h \tan(2\theta + \beta) - d \tan(2\theta)$$

$$y = h \tan(2\phi + \alpha)$$

However this equation compensates for the tilt of the layout device 102. There is also accompanying distortion of the image, often called keystoning, which occurs when the layout device 102 may be tilted. The keystone distortion can be approximated by applying the equation below for each axis of tilt (x-axis, y-axis, and z-axis).

$$\frac{\cos\left(\varepsilon - \frac{\alpha}{2}\right)}{\cos\left(\varepsilon + \frac{\alpha}{2}\right)}$$

In the above equation, ε is the angle between a line normal to the physical surface 104 and the central ray from the projector 220 and a is the width of the focus, (which in this embodiment is the angle of the laser of the projector 220 with respect to the neutral beam position 402b.) Applying ε and α to the equation above the following equation which accounts for distortion in both the x-axis and y-axis results:

$$\frac{\cos\left(\beta - \frac{2\theta}{2}\right)\cos\left(\alpha - \frac{2\phi}{2}\right)}{\cos\left(\beta + \frac{2\theta}{2}\right)\cos\left(\alpha + \frac{2\phi}{2}\right)}$$

$$\frac{\cos(\beta - \theta)\cos(\alpha - \phi)}{\cos(\beta + \theta)\cos(\alpha + \phi)}$$

Applying this to the equations for x and y yields:

$$x = -h\tan(2\theta + \beta)\frac{\cos(\beta - \theta)\cos(\alpha - \phi)}{\cos(\beta + \theta)\cos(\alpha + \phi)}$$

$$y = h\tan(2\theta + \alpha)\frac{\cos(\beta - \theta)\cos(\alpha - \phi)}{\cos(\beta + \theta)\cos(\alpha + \phi)}$$

To compensate for the rotation of the projector 220, the rotation of the xy-plane of the projector can be compensated with the xy-plane of the ground using a rotation matrix. Creating a matrix of the (x, y) points and multiplying that by the rotation matrix, with w as a positive rotation about the z-axis, gives the new (x, y) points corresponding to the rotated coordinate system:

$$\begin{bmatrix} X \\ Y \end{bmatrix} = \begin{bmatrix} \cos(\psi) & -\sin(\psi) \\ \sin(\psi) & \cos(\psi) \end{bmatrix} \begin{bmatrix} x \\ y \end{bmatrix} \quad \text{(Eq. 1)}$$

$$\begin{bmatrix} X \\ Y \end{bmatrix} = \begin{bmatrix} \cos(\psi) & -\sin(\psi) \\ \sin(\psi) & \cos(\psi) \end{bmatrix} \cdot \left( \begin{bmatrix} -h\tan(2\theta + \beta) \\ h\tan(2\phi + \alpha) \end{bmatrix} \cdot \begin{bmatrix} \cos(\beta - \theta) & \cos(\alpha - \phi) \\ \cos(\beta + \theta) & \cos(\alpha + \phi) \end{bmatrix} \right)$$

Multiplied out, the following two equations result:

$$X = -\frac{h*(\tan(\beta + 2\theta)*cos(\psi) + \tan(\alpha + 2\phi)*\sin(\psi))*\cos(\beta - \theta)*\cos(\alpha - \phi)}{\cos(\beta + \theta)*\cos(\alpha + \phi)}$$

$$Y = \frac{h*(-\tan(\beta + 2\theta)*\sin(\psi) + \tan(\alpha + 2\phi)*\cos(\psi))*\cos(\beta - \theta)*\cos(\alpha - \phi)}{\cos(\beta + \theta)*\cos(\alpha + \phi)}$$

Utilizing these two equations for X and Y, the following method can be performed. The layout engine 216 begins by receiving the positional data (e.g., location data and the orientation data (including yaw data, pitch data, and roll data)) of the layout device 102. The layout engine calculates the four corners of the projectable area (e.g., a projector bound) based on the size of the projection area determined by a user, and determines the objects within the projectable area using standard image processing algorithms, such as creating an array of points and identifying which points in the blueprint include a portion of an object and which points of the blueprint do not include a portion of an object. In some embodiments, the blueprint may be stored as an array of looping line segments, where each end point of one line is the start point of the next line. The layout engine creates an array (2 by N) of (x, y) points for all the objects by identifying all line start/end points related to each object within the projectable area. (N=number of line start/end points).

In some embodiments, the object coordinates and representation of the objects may be determined by identifying projectable lines as the representation of the objects. The projector engine 218 may determine if a line depicted in the blueprint intersects with a projector bound, which may include the edge of the projection area, a physical limitation of the projector 220, or another bound, such as a wall that may not be included in the projection. If the line intersects with the projector bound, then the layout engine may determine if the line intersects another projector bound. If the line does not intersect another projector bound, then the layout engine 218 may create a representation of the line from the two intersection points and add the points to a used points array.

If the line does not intersect another projector bound, then the layout engine 218 may determine which point lies inside the projector bound and create a line segment array from the intersection point with the projector bound and the point that lies within the projector bound. The layout engine 218 may then determine if the next point in the line is within the projector bounds. If the next point is within the projector bounds then the next point is added to the line segment array being created and the process repeats with the next point to add to the line segment array.

If the next point in the line list is not within the projector bounds, then the layout engine 218 may determine the intersection point between the line segment array created and the projector bounds and add this intersection point to the array. The layout engine 218 may then create a projection segment from the array and add the points of the projection segment to the used points array.

With reference again to the first step of determining if the line does not interest a projector bound, then the layout engine 218 may determine if both points are contained inside the determined projection area 220 for the projector and the points may be added to the used points array if both points are not contained. If both are contained inside the projection area then the layout engine 218 may create a line segment array with both points and add the points to the used points array.

The layout engine 218 may determine if the preceding line segment intersects with the projector bound. If the preceding line segment does not intersect then the layout engine 218 may determine if the preceding point is included in the used points array. If the preceding point is not included in the used points array, the layout engine 218 may add the point to the beginning of the line segment array and analyze the next preceding point. If the layout engine 218 determines the preceding point is included in the used points array the layout engine 218 may create a projection segment (e.g., a line or multiple lines based on the objects) and add the points of the projection segment to the used points array.

If the layout engine 218 determines that the preceding line segment does intersect a projector bound then the layout engine 218 adds the intersection point to a beginning of a line segment array. The layout engine 218 may determine if the line segment after the intersection intersects with a projector bound. If the line segment after the intersection does not intersect then the layout engine 218 may add that point to the end of the line segment array and the layout engine 218 may determine if the next point intersects with a projector bound. If the line segment after the intersection does intersect then the layout engine 218 may add the intersection point to the end of the line segment array, create a projection segment from the array, and add the points to the used points array.

Next, the projector engine 218 calculates the angles (of the mirrors of the projector 220) for moving the laser of the projector 220 to the given (x, y) points and store in an array (2 by N). The projector engine 218 then creates an array (1 by N) of true/false values corresponding to the mirror angles (e.g., mirror positions) indicating if the laser of the projector should be on or off for each (x, y) point, and calculates the voltage values corresponding to the mirror angles (e.g., mirror positions) and stores the voltage values in an array (2 by N). The projector engine 218 sends the voltage values array and true/false array to the projector 220. In some embodiments, the projector 220 may include a separate microcontroller for directing the projector. In some embodiments, the projector engine 218 may send the mirror angles and location data to the electronic information source. One or more of the above operations may be repeated as required to provide the representation of the layout 108.

In some embodiments, the projector engine 218 may determine the maximum and minimum angles the projector 220 can reach and use the maximum and minimum values to determine the four corners of the projection area to identify the projection area coordinates. In further embodiments, the maximum and minimum values may be user or manufacturer determined based on preference and/or performance optimization. The x and y offset of the specific location of the layout device 102 can be added to improve the performance. In some embodiments, the location sensor 212 and the projector 220 may be separated by enough distance that the different coordinates of each must be incorporated as shown below:

$$\begin{bmatrix} X \\ Y \end{bmatrix} = \begin{bmatrix} \cos(\psi) & -\sin(\psi) \\ \sin(\psi) & \cos(\psi) \end{bmatrix} \cdot \left( \begin{bmatrix} -h\tan(2\theta + \beta) \\ h\tan(2\phi + \alpha) \end{bmatrix} \cdot \begin{bmatrix} \frac{\cos(\beta - \theta)}{\cos(\beta + \theta)} \frac{\cos(\alpha - \phi)}{\cos(\alpha + \phi)} \end{bmatrix} \right)$$

$$X_{GL} = X + X_{offset}$$

$$Y_{GL} = Y + Y_{offset}$$

By combining the above expressions, the following equation results as depicted by the equation below and graph 600 in FIG. 6:

$$\begin{bmatrix} X_{GL} \\ Y_{GL} \end{bmatrix} = \begin{bmatrix} \cos(\psi) & -\sin(\psi) \\ \sin(\psi) & \cos(\psi) \end{bmatrix} \cdot \left( \begin{bmatrix} -h\tan(2\theta + \beta) \\ h\tan(2\phi + \alpha) \end{bmatrix} \cdot \begin{bmatrix} \frac{\cos(\beta - \theta)}{\cos(\beta + \theta)} \frac{\cos(\alpha - \phi)}{\cos(\alpha + \phi)} \end{bmatrix} \right) + \begin{bmatrix} X_{offset} \\ Y_{offset} \end{bmatrix} \quad \text{(Eq. 1)}$$

Figure 6:
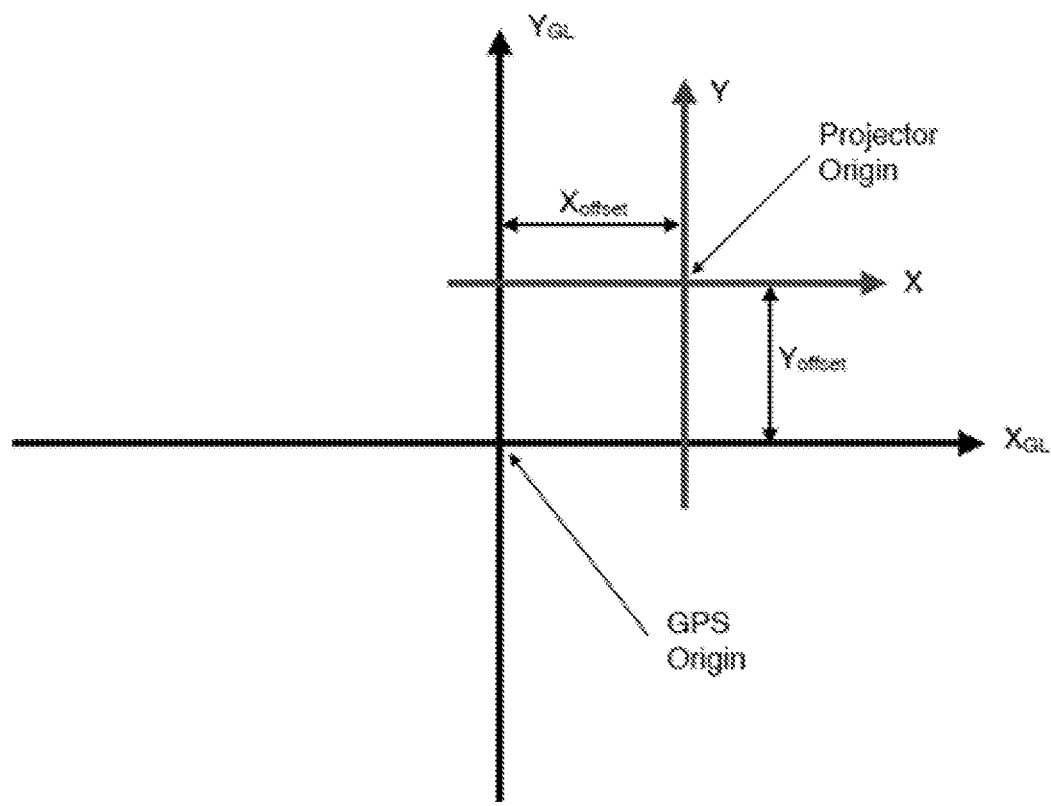
FIG. 6 shows a graphical representation of a coordinate plane.

By taking Equation 1 and subtracting the Xoffset and Yoffset values (as shown in FIG. 6), the (x, y) in the projectors coordinate frame is obtained:

$$\begin{bmatrix} X_{GL} \\ Y_{GL} \end{bmatrix} - \begin{bmatrix} X_{offset} \\ Y_{offset} \end{bmatrix} = \begin{bmatrix} \cos(\psi) & -\sin(\psi) \\ \sin(\psi) & \cos(\psi) \end{bmatrix} \cdot \left( \begin{bmatrix} -h\tan(2\theta + \beta) \\ h\tan(2\phi + \alpha) \end{bmatrix} \cdot \left[ \frac{\cos(\beta - \theta)}{\cos(\beta + \theta)} \frac{\cos(\alpha - \phi)}{\cos(\alpha + \phi)} \right] \right)$$

$$\begin{bmatrix} X_{GL} - X_{offset} \\ Y_{GL} - Y_{offset} \end{bmatrix} = \begin{bmatrix} \cos(\psi) & -\sin(\psi) \\ \sin(\psi) & \cos(\psi) \end{bmatrix} \cdot \left( \begin{bmatrix} -h\tan(2\theta + \beta) \\ h\tan(2\phi + \alpha) \end{bmatrix} \cdot \left[ \frac{\cos(\beta - \theta)}{\cos(\beta + \theta)} \frac{\cos(\alpha - \phi)}{\cos(\alpha + \phi)} \right] \right)$$

Multiplying both sides by the inverse of the rotation matrix provides:

$$\begin{bmatrix} \cos(\psi) & \sin(\psi) \\ -\sin(\psi) & \cos(\psi) \end{bmatrix} * \begin{bmatrix} X_{GL} - X_{offset} \\ Y_{GL} - Y_{offset} \end{bmatrix} =$$

$$\left( \begin{bmatrix} -h\tan(2\theta + \beta) \\ h\tan(2\phi + \alpha) \end{bmatrix} \cdot \left[ \frac{\cos(\beta - \theta)}{\cos(\beta + \theta)} \frac{\cos(\alpha - \phi)}{\cos(\alpha + \phi)} \right] \right)$$

Setting the left side equal to Xtrans and Ytrans yields:

$$\begin{bmatrix} X_{trans} \\ Y_{trans} \end{bmatrix} = \begin{bmatrix} \cos(\psi) & \sin(\psi) \\ -\sin(\psi) & \cos(\psi) \end{bmatrix} * \begin{bmatrix} X_{GL} - X_{offset} \\ Y_{GL} - Y_{offset} \end{bmatrix} \quad \text{(Eq. 5.1)}$$

$$\begin{bmatrix} X_{trans} \\ Y_{trans} \end{bmatrix} = \left( \begin{bmatrix} -h\tan(2\theta + \beta) \\ h\tan(2\phi + \alpha) \end{bmatrix} \cdot \left[ \frac{\cos(\beta - \theta)}{\cos(\beta + \theta)} \frac{\cos(\alpha - \phi)}{\cos(\alpha + \phi)} \right] \right)$$

The equation above is non-linear, the Newton-Raphson numerical method may be applied to solve for θ and ϕ. To use the Newton-Raphson numerical method, the equations must be in the form 0=f(x)−x so the equation is first expanded:

$$X_{trans} = -h\tan(2\theta + \beta) \frac{\cos(\beta - \theta)}{\cos(\beta + \theta)} \frac{\cos(\alpha - \phi)}{\cos(\alpha + \phi)}$$

$$Y_{trans} = h\tan(2\phi + \alpha) \frac{\cos(\beta - \theta)}{\cos(\beta + \theta)} \frac{\cos(\alpha - \phi)}{\cos(\alpha + \phi)}$$

Then the equations are put into the proper form, represented by u and v:

$$u = -h\tan(2\theta + \beta) \frac{\cos(\beta - \theta)}{\cos(\beta + \theta)} \frac{\cos(\alpha - \phi)}{\cos(\alpha + \phi)} - X_{trans} \quad \text{(Eq. 5.2)}$$

$$v = h\tan(2\phi + \alpha) \frac{\cos(\beta - \theta)}{\cos(\beta + \theta)} \frac{\cos(\alpha - \phi)}{\cos(\alpha + \phi)} - Y_{trans} \quad \text{(Eq. 5.3)}$$

The angles used for a given XGL and YGL can be obtained by iteratively solving the following equations until the values of θ and ϕ converge.

$$\theta_{i+1} = \theta_i - \frac{u_i \frac{\partial v_i}{\partial \phi} - v_i \frac{\partial u_i}{\partial \phi}}{\frac{\partial u_i \partial v_i}{\partial \theta \partial \phi} - \frac{\partial u_i \partial v_i}{\partial \phi \partial \theta}} \quad \text{(Eq. 5.4)}$$

$$\phi_{i+1} = \phi_i - \frac{v_i \frac{\partial u_i}{\partial \theta} - u_i \frac{\partial v_i}{\partial \theta}}{\frac{\partial u_i \partial v_i}{\partial \theta \partial \phi} - \frac{\partial u_i \partial v_i}{\partial \phi \partial \theta}} \quad \text{(Eq. 5.5)}$$

An experimental value may be provided initially for the above equation in some cases. For instance, Equation 5.1 may be initially modified to solve for the absolute position of the projector 220 origin. The equation accounts for the lateral movement and rotation of the layout device 102. In some embodiments, to account for the shift in origin due to the tilting of the layout device 102, resulting in a tilting of the projector 220, Equation 1 may be solved for x and y when θ=0 and ϕ=0 (calling these values X0 and Y0). These values are then subtracted from Xtrans and Ytrans yielding the following:

$$\begin{bmatrix} X_{trans} \\ Y_{trans} \end{bmatrix} = \begin{bmatrix} \cos(\psi) & \sin(\psi) \\ -\sin(\psi) & \cos(\psi) \end{bmatrix} * \begin{bmatrix} X_{GL} - X_{offset} \\ Y_{GL} - Y_{offset} \end{bmatrix} - \begin{bmatrix} X_0 \\ Y_0 \end{bmatrix} \quad \text{(Eq. 5.6)}$$

$$\begin{bmatrix} X_0 \\ Y_0 \end{bmatrix} = \begin{bmatrix} \cos(\psi) & -\sin(\psi) \\ \sin(\psi) & \cos(\psi) \end{bmatrix} \cdot \left( \begin{bmatrix} -h\tan(\beta) \\ h\tan(\alpha) \end{bmatrix} \cdot \left[ \frac{\cos(\beta)}{\cos(\beta)} \frac{\cos(\alpha)}{\cos(\alpha)} \right] \right) \quad \text{(Eq. 5.7)}$$

!(Note: this equation is Eq. 1 with θ, ϕ, $X_{offset}$, $Y_{offset}$=0)!

Because of the complexity of the derivatives, the centered difference approximation of a first derivative can be used. Δθ and Δϕ may represent the changes in θ and ϕ used in the approximation as follows:

$$f'(x) = \frac{f(x + \Delta x) - f(x - \Delta x)}{2\Delta x} \quad \text{(Eq. 5.8)}$$

Utilizing the following equations, the angles for a given (x, y) value may be solved by:

Solving Equation 5.7 for X0 and Y0.
Solving Equation 5.6 for Xtrans and Ytrans.
Solving Equation 5.8 for $$\frac{\partial u_i}{\partial \theta}, \frac{\partial u_i}{\partial \phi}, \frac{\partial v_i}{\partial \theta},$$

and $$\frac{\partial v_i}{\partial \phi}.$$

Solving Equation 5.4 and Equation 5.5 for θ and ϕ either using the previous values for θ and ϕ or using an initial guess value based upon which quadrant of the projectable area the point falls into.

If satisfactory convergence has not yet been obtained or if this is the first iteration through, repeat the above process using new values of θ and ϕ.

Verify the correct values have been found and insert the values into Equation 1 and solve for XGL and YGL, then compare the values with the initial point in the global coordinate system. The values should relatively match.

The angles θ and φ need to be converted to an integer value representing the voltage level being sent to the projector 220. In one example, where the projector 220 is a specific type of Galvanometer controller, the Galvanometer accepts an input voltage of ±0-5V Volts and has a max and min angle of ±20°, then the voltage corresponding to a given angle Y could be $$v = \frac{5\text{ V}}{20°}\gamma = .25\ \gamma.$$

If the voltage controller of the Galvanometer in the above example is 12 bit, it can output 4096 different values. For an output of ±0-5V, the controller of the Galvanometer would be able to output between −2048 and 2047. The voltage level corresponding to a given angle could be:

$$v_i = \frac{2048}{5\text{ V}}\frac{5\text{ V}}{20°}\gamma = 102.4\ \gamma$$

Figure 5:
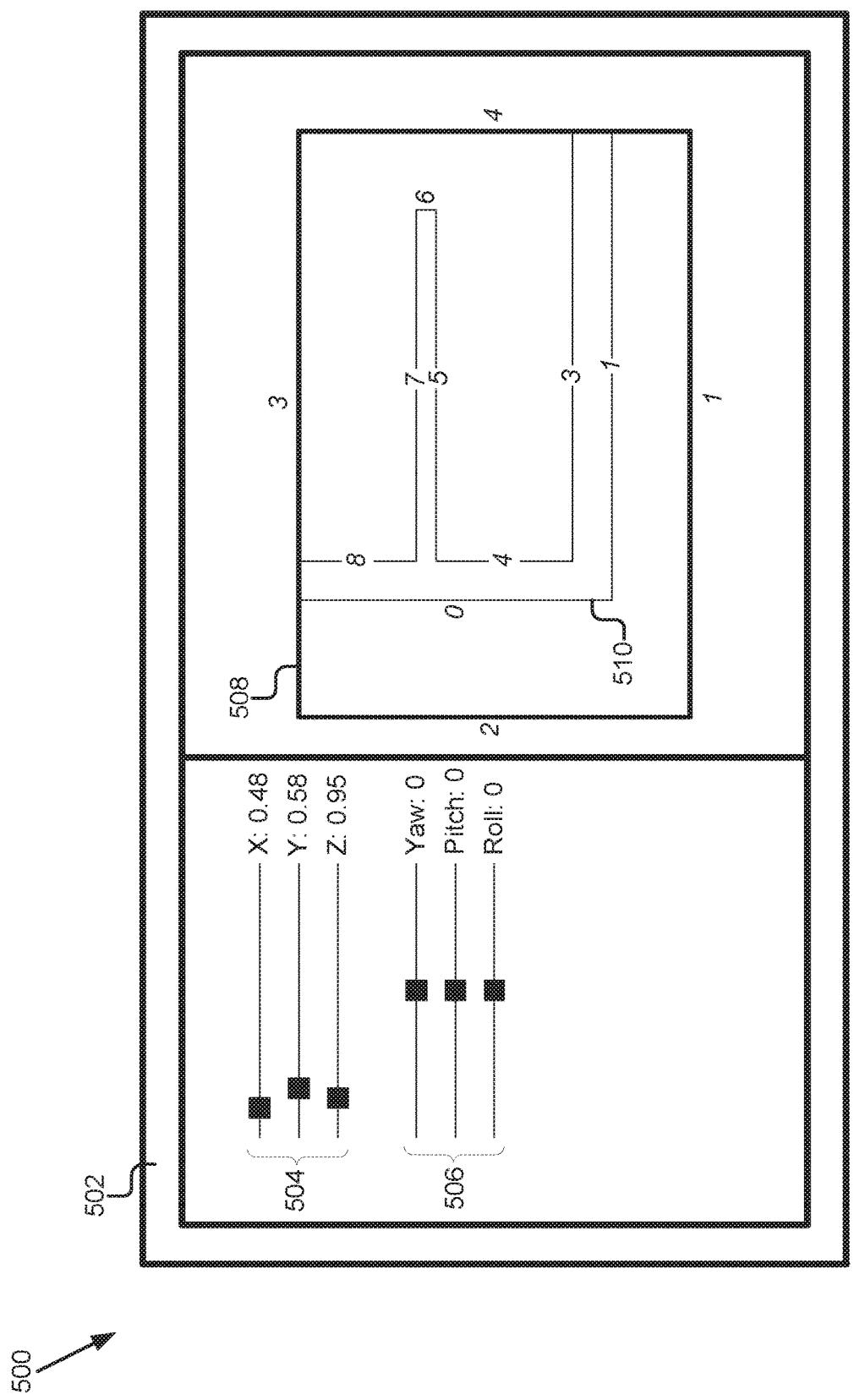
FIG. 5 shows a graphical representation of an example graphical user interface.

FIG. 5 shows a graphical representation of an example graphical user interface 500. The graphical user interface 500 may be displayed via a display of an electronic information source by an application for accessing and viewing the blueprint, and configuring a projection.

In some embodiments, the graphical user interface 500 may be displayed on a display of the layout device 102. In these embodiments, the layout engine 216 or another suitable component may provide the functionality of the graphical user interface 500. In further embodiments, the information source may be remote from the layout device 102 and data from the application may be transmitted to and used by the layout device 102 (e.g., the layout engine 216 may be distributed across devices, or may be configured to receive configuration data from another information source, etc.).

As shown, the graphical user interface 500 may include a window 502 having a dimension slider 504, an angle slider 506, and/or a projection area display 508.

The dimension slider 504 may include sliders that a user may adjust to change the dimensions of the projection area 106 as displayed on the window 502 as the projection area display 508. The dimension slider 504 may include an x-axis slider, a y-axis slider, and/or a z-axis slider. For example, a work site may include an area where a pipe is being placed in a wall and user may customize the dimension slider 504 to display the dimensions where the pipe is displayed and not display a larger area that projector 220 may be capable of displaying.

The angle slider 506 displays the detected yaw error, pitch error, and roll error present in the layout device 102. A user may be able to customize the angles using the angle slider 506 to adjust and correct for various issues. The projection area display 508 may be adjusted based on the dimension slider 504 and/or the angle slider 506. In some embodiments, as the sliders 504 and/or 506 are adjusted, the projection area display 508 provides a preview of what the projection area 106 would include, such as a preview of the representation of the layout 510. The projection area display 508 may also be zoomed in and out, allowing a user to quickly move through the sliders and maximize the area that the user desires to project on the physical surface 104.

In some embodiments, the technology described herein may be used for alternative solutions that incorporate projecting a layout. For example, the layout device 102 may be used for hanging pictures on a wall. A user may take a picture of the back of a picture frame and upload the picture to the layout device 102 and the layout device 102 may project on the wall the location of the picture frame as well as where the holes for hanging the picture should be located based on the back of the picture frame image.

In further examples, the layout device 102 may be used to project the location of can lights or other hardware used in construction of buildings. Specifically, the layout device 102 may project the location of the light or other hardware, as well as projecting where mounting components should be placed. In further embodiments related to construction, the layout device 102 may be used to project a leveling of a surface. The layout device 102 may highlight or otherwise indicate areas that are not proper grade or height and track in real time the grading of the area, as well as providing indications of the level of a projectable area in real time.

In further embodiments, the layout device 102 may be used to project routes, such as infrared routes. A route could be determined and uploaded to the layout device 102 and the layout device 102 may project the route onto a projectable surface. In further embodiments, the layout device 102 may be configured to follow the route and update the projected route as the layout device 102 moves along the route.

In further embodiments, the layout device 102 may be used to project a key or token of a specific layout to unlock a location. For example, a special image specific to a function could be projected to a receiver to unlock a door. In further embodiments, the projection could be projected to an object in motion and the receiver located on the object in motion may be configured to detect the special image projected by the layout device 102.

In further embodiments, the layout device 102 may be used as a visual inspection tool for manufacturing purposes by a human operator or a smart vision camera. The layout device 102 may project a predefined representation and the products being analyzed may be examined in comparison to the representation to determine if the products meet quality control criteria.

Technology for projecting a layout has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus or software communication mechanism.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus or software communication mechanism. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A projection apparatus comprising:
an orientation sensor that determines orientation data;
a location sensor that determines location data;
a layout engine, executable by one or more processors, that is configured to receive the location data and the orientation data,
determine a projectable area of a projector of the projection apparatus in an operating environment based on a physical limitation of the projector,
create a coordinate plane associated with a blueprint of the operating environment;

map a location of the projection apparatus and the projectable area relative to the location of the projection apparatus to the coordinate plane based on the location data, determine, in the blueprint of the operating environment, an array of points representing an object, determine, from the array of points representing the object in the blueprint, a set of points located within the projectable area of the projector that has a minimal distance between each consecutive points in the set of points satisfying a predefined distance threshold, the set of points corresponding to a portion of the object located within the projectable area, and determine object coordinates of the set of points corresponding to the portion of the object in the coordinate plane associated with the blueprint relative to the location of the projection apparatus;

a projection engine, executable by the one or more processors, that is configured to receive the object coordinates of the set of points and the location of the projection apparatus, and calculate mirror positions for a mirror of the projection apparatus based on the object coordinates of the set of points and the location of the projection apparatus; and the projector including the mirror and an emitter, the projector projecting the set of points corresponding to the portion of the object from the emitter using the calculated mirror positions.

2. The projection apparatus of claim 1, wherein the layout engine is further configured to determine that the portion of the object depicted in the blueprint is within the projectable area.

3. The projection apparatus of claim 1, wherein the layout engine being configured to determine the set of points located within the projectable area of the projector further comprises the layout engine being configured to:

identify a starting point and an ending point of the object in the projectable area.

4. The projection apparatus of claim 3, wherein the set of points comprise a line beginning at the starting point and ending at the ending point, the line representing an outline of the object.

5. The projection apparatus of claim 4, wherein the layout engine is further configured to:

determine one of direction change coordinates where the line changes a direction and intersect coordinates where the line intersects with another object; and create overshoot points that are added to the set of points at a location of one of the direction change coordinates and the intersect coordinates.

6. The projection apparatus of claim 1, wherein the location sensor is one of a GPS sensor, an ultra-wideband sensor, a LIDAR sensor, and a radio positioning sensor;

the location data comprises signals received at the location sensor from separate radio communication nodes; and the layout engine is configured to map the location of the projection apparatus by triangulating a position of the location sensor relative to the separate radio communication nodes.

7. The projection apparatus of claim 1, wherein the layout engine is configured to determine a tilt of the projection apparatus using the orientation data; and the projection engine is configured to receive the tilt of the projection apparatus, and calculate the mirror positions for the mirror of the projection apparatus further based on the tilt of the projection apparatus.

8. The projection apparatus of claim 1, wherein the blueprint depicts a physical premises of a worksite and includes one of an image of a wall location, an image of a pipe location, an image of an electrical location, and an image of a footing location.

9. The projection apparatus of claim 1, wherein the orientation data includes a yaw angle, a pitch angle, and a roll angle.

10. A method comprising:

receiving location data from a location sensor and orientation data from an orientation sensor;

determining a tilt of a projection apparatus using the orientation data;

determining a projectable area of a projector of the projection apparatus in an operating environment based on a physical limitation of the projector;

creating a coordinate plane associated with a blueprint of the operating environment;

mapping a location of the projection apparatus and the projectable area relative to the location of the projection apparatus to the coordinate plane based on the location data;

determining, in the blueprint of the operating environment, an array of points representing an object;

determining, from the array of points representing the object in the blueprint, a set of points located within the projectable area of the projector that has a minimal distance between each consecutive points in the set of points satisfying a predefined distance threshold, the set of points corresponding to a portion of the object located within the projectable area;

determining object coordinates of the set of points corresponding to the portion of the object in the coordinate plane associated with the blueprint relative to the location of the projection apparatus;

calculating mirror positions for a mirror of the projection apparatus based on the object coordinates of the set of points and the tilt of the projection apparatus; and projecting, from an emitter of the projector of the projection apparatus, the set of points corresponding to the portion of the object within the projectable area using the calculated mirror positions.

11. The method of claim 10, further comprising:

determining that the portion of the object depicted in the blueprint is within the projectable area.

12. The method of claim 10, wherein determining the set of points located within the projectable area of the projector further comprises:

identifying a starting point and an ending point of the object in the projectable area.

13. The method of claim 12, wherein the set of points comprise a line beginning at the starting point and ending at the ending point, the line representing an outline of the object.

14. The method of claim 13, further comprising:

determining one of direction change coordinates where the line changes a direction and intersect coordinates where the line intersects with another object; and creating overshoot points that are added to the set of points at a location of one of the direction change coordinates and the intersect coordinates.

15. The method of claim 10, wherein the location sensor includes one or more of a GPS sensor, an ultra-wideband sensor, a LIDAR sensor, and a radio-positioning sensor.

16. The method of claim 10, wherein the orientation data includes a yaw angle, a pitch angle, and a roll angle.

17. The method of claim 10, wherein the blueprint depicts a physical premises of a worksite and includes one of an image of a wall location, an image of a pipe location, an image of an electrical location, and an image of a footing location.

18. The method of claim 10, wherein the location data comprises signals received at the location sensor from separate radio communication nodes and mapping the location of the projection apparatus further comprises:
  determining the location of the projection apparatus by triangulating a position of the location sensor relative to the separate radio communication nodes.

19. A method comprising:
  receiving location data from a location sensor and orientation data from an orientation sensor;
  determining a tilt of a projection apparatus using the orientation data;
  determining a projectable area of a projector of the projection apparatus in an operating environment based on an angle of the projector;
  creating a coordinate plane associated with a blueprint of the operating environment;
  mapping a location of the projection apparatus and the projectable area relative to the location of the projection apparatus to the coordinate plane based on the location data;
  determining, in the blueprint of the operating environment, an array of points representing an object;
  determining, from the array of points representing the object in the blueprint, a set of points located within the projectable area of the projector that has a minimal distance between each consecutive points in the set of points satisfying a predefined distance threshold, the set of points corresponding to a portion of the object located within the projectable area;
  determining object coordinates of the set of points corresponding to the portion of the object in the coordinate plane associated with the blueprint relative to the location of the projection apparatus;
  calculating mirror positions for a mirror of the projector based on the object coordinates of the set of points and the tilt of the projection apparatus; and
  projecting, from an emitter of the projector, the set of points corresponding to the portion of the object within the projectable area using the calculated mirror positions.

20. The method of claim 19, wherein the projectable area is a rectangular area and corners of the projectable area comprise four corners of the rectangular area based on a maximum angle and a minimum angle of the projector.

* * * * *